United States Patent
Sugimoto et al.

[11] Patent Number: 6,042,033
[45] Date of Patent: Mar. 28, 2000

[54] APPARATUS FOR PRECISE TREATMENT OF POWDER AND PARTICLE

[75] Inventors: Yutaka Sugimoto; Shuzo Nomiyama, both of Kanagawa-ken, Japan

[73] Assignee: Shinko Imbest Co., Ltd., Yokohama, Japan

[21] Appl. No.: 09/208,726

[22] Filed: Dec. 9, 1998

[51] Int. Cl.$^7$ .................................................... B02C 23/02
[52] U.S. Cl. ................................. 241/46.02; 241/46.17; 241/101.2; 241/282.1
[58] Field of Search ........................... 241/46.04, 46.17, 241/101.2, 282.1, 46.11, 46.02

[56] References Cited

U.S. PATENT DOCUMENTS

| | | | |
|---|---|---|---|
| 4,511,093 | 4/1985 | Ohkoshi et al. | 241/60 |
| 4,556,175 | 12/1985 | Motoyama et al. | 241/57 |
| 4,623,098 | 11/1986 | Motoyama et al. | 241/46.04 |
| 4,789,105 | 12/1988 | Hosokawa et al. | 241/67 |
| 5,720,439 | 2/1998 | Nakazawa et al. | 241/21 |

Primary Examiner—John M. Husar
Attorney, Agent, or Firm—Flynn, Thiel, Boutell & Tanis, P.C.

[57] ABSTRACT

An apparatus 10 for precise treatment of powder/particle of the invention includes a vessel 11 which can be sealingly closed by a closure carrying a raw material supply on its upper surface, a rotary shaft 12 extending through the center of the bottom surface of the vessel, an agitation blade assembly 13 extending from the upper end of the rotary shaft in a radial array along the bottom surface of the vessel 11, and a chopper 36 for adjusting grain diameters of powder/particles mixed by the assembly. A horizontal turntable 24 is fixedly mounted on the upper end of the rotary shaft 12. A second rotary shaft 25 extends along the axis of the rotary shaft 12 and through the turntable 24. A second agitation blade assembly 27 extends in a radial array along the front surface of the turntable 24. The rotational speed of the second agitation blade assembly 27 and a mixer blade assembly 34 is higher than the rotational speed of the turntable 24.

10 Claims, 3 Drawing Sheets

APPARATUS FOR PRECISE TREATMENT OF POWDER AND PARTICLE

BACKGROUND OF THE INVENTION

1. Field of the Invention

The invention relates to an apparatus for the precise treatment of powder and particles of an inorganic and an organic industrial chemical, ceramics, medicine, foodstuff and the like as they are mixed or granulated.

2. Description of the Related Art

A variety of types are known in the art for arrangements which treat powder and/or particles. By way of example, FIG. 3 is a perspective view of a typical granulator of the agitation type which has been extensively used in the art. As shown, the granulator comprises an agitation blade assembly 2 centrally disposed on the bottom surface of a vessel 1, which is sealingly closed by a closure 3 as a charge of powder and/or particles is granulated using the assembly 2. The assembly 2 comprises a rotary shaft 2A, and a plurality of blades which are mounted on the top end of the rotary shaft 2A in a radial array and which may range from 3 to 6 in number. These blades are driven for rotation in a horizontal plane while maintaining a given clearance with respect to the bottom surface of the vessel 1 so that the powder and/or particles may be agitated by the blades for the purpose of granulation. More specifically, a motor 4 is located below the vessel 1 and is connected through a pulley mechanism 4A with a reduction gear 4B, which serves to reduce the rotational speed of the motor 4 in a suitable manner so that the agitation blade assembly 2 may be driven at a given rotational speed. A chopper 5 is mounted on the inner peripheral wall of the vessel 1 and is associated with a motor 6 located outside the vessel 1 so as to be driven thereby to rotate at a high speed within the vessel 1 for crushing or disintegrating the powder or particles received in the latter. A discharge port, not shown, is formed in the peripheral wall of the vessel 1 at a position which is diametrically opposite to the chopper 5, and is associated with a chute 7 which is located slightly below the port. A valve 7A is mounted in the discharge out of the vessel 1 and may be opened to discharge grains which are prepared within the vessel 1 through the chute 7.

On the other hand, the closure 3 is formed with a plurality of openings 3A, only one of which is shown in FIG. 3, for connection with accessory units such as a hopper and a pneumatic conveyor, both not shown, which are used to feed the powder and/or particles to each opening 3A. When a plurality of accessory units are connected with the closure 3 in this manner, the weight of the closure 3 increases to present a difficulty to the manual opening/closing of the closure 3 by an operator. To accommodate for this, a counterweight 8 is attached to the closure 3 through an arm 8A, thus allowing the closure 3 to be opened and closed with a relatively small force. A spray nozzle 9 serves to feed a binder into the charge of the powder and/or particles received within the vessel 1.

When the described granulator of the agitation type is used to granulate the powder and/or particles into grains, the vessel 1 is initially closed by the closure 3 and a given charge of powder and/or particles is fed through the hopper. Subsequently, the motors 4 and 6 are set in motion and a binder is fed into the vessel 1 through the spray nozzle 9, whereupon the agitation blade assembly 2 operates to agitate and mix the charge while causing a uniform impregnation of the charge with the binder to promote the granulation process, and the chopper 5 is effective to adjust the grain size. In this manner, the agitation blade assembly 2 cooperates with the chopper 5 to granulate the charge into grains while causing them to roll on the bottom surface of the vessel 1. As grains of a desired grain size are formed, the charge of powder and/or particle continues to find its way into interstices between the grains thus formed, and is sequentially formed into grains in conjunction with the binder action, ultimately converting the entire charge into grains.

Upon completion of the granulation process, the valve 7A is driven to open the discharge port, whereupon the agitation blade assembly 2 is effective to displace the grains formed to the outside of the vessel 1 through the discharge port and the chute 7 in a gradual manner. When all the grains are displaced out of the vessel 1, a fresh charge of powder and/or particles may be fed into the vessel 1 to repeat the granulation process described above. Thus, the conventional granulator mentioned above is operated as a batch type granulator.

A problem with the above granulator resides in the fact that accomplishing the agitation and mixing of the charge of powder and/or particles by the use of the agitation blade assembly 2 results in an insufficient mixing of the charge and a difficulty of achieving an even mixing of the charge when the amount of charge fed into the vessel 1 is increased, thus making it difficult to obtain grains of an even quality. It will also be noted that the agitation blade assembly 2 has a peripheral speed associated with its radially outer end which is different from a peripheral speed associated with its central part, thus producing differential granulation effects between these parts. Thus, if the rotational speed of the agitation blade assembly 2 is determined on the basis of the peripheral speed at the radially outer end, the peripheral speed at the central part will be too low, thus drastically degrading or even prohibiting the granulation effect at this part. Conversely, if the rotational speed of the agitation blade assembly 2 is determined on the basis of the peripheral speed which prevails at the central part, the peripheral speed at the radially outer end will be too high, causing a crushing of grains formed in this region. Thus, the granulator is unable to prepare grains of an even diameter. Because there is a large difference in the peripheral speed between the central part and the radially outer end as mentioned above, and because this difference increases with an increase in the internal diameter of the vessel, a scale-up of the granulator mentioned is substantially inhibited, whereby its capacity to produce grains is limited. To increase the capacity, there must be provided a plurality of these granulators.

An apparatus for the treatment of powder and/or particles also includes a mixer which mixes powders and/or particles. A mixer of the paddle type is known as a typical one of the arrangements which continuously mixes powders and/or particles. A mixer of the paddle type comprises a horizontally elongate vessel, a rotary shaft disposed within and extending longitudinally of the vessel, a plurality of paddles mounted on the rotary shaft at a given interval, and a motor for driving the paddles for rotation through the rotary shaft. A supply port is formed in the upper surface of the elongate vessel at one end thereof while a discharge port is formed in the bottom surface of the vessel at the other end thereof for discharging a resulting mixture.

When powders and/or particles are to be mixed together, a plurality of different powders and/or particles are continuously fed into the vessel through the supply port. The rotating paddles within the vessel displaces them to the discharge port while gradually mixing them, whereby they are continuously displaced through the discharge port as a mixture.

In this instance, the paddles allow an even mixing of the plurality of powders and/or particles, but because the paddles lack the function of crushing the powders and/or particles, in the event a coagulation comprising an uneven mixture of the plurality of powders and/or particles is admixed into the charge of the vessel, the paddle mixer merely mixes the coagulation in its intact form with the remainder of the charge, and thus cannot prepare an even mixture of powders and/or particles in the sense of the initial primary powder/particle level because the coagulation cannot be crushed into levels of powder/particle diameters which the plurality of powders and/or particles originally exhibited.

It is therefore a first object of the invention to provide an apparatus for the precise treatment of powder and/or particle which is capable of efficiently manufacturing grains of a uniform grain diameter and which allows a scale-up for its use as a batch granulator of the agitation type. It is a second object of the invention to provide an apparatus of the above type which can be operated as a continuous precision granulator capable of continuously manufacturing grains having a uniform grain diameter and having differential specific gravities between an outer shell and an inner core thereof. It is a third object of the invention to provide an apparatus of the above type which can be operated as a continuous precision granulator capable of continuously manufacturing grains having a uniform grain diameter and having an even overall specific gravity. Finally, it is a fourth object of the invention to provide an apparatus of the above type which can be operated as a mixer capable of continuously manufacturing mixtures of grains, each grain representing an even mixture of primary level powders/particles.

SUMMARY OF THE INVENTION

According to a first invention of the present application, there is provided an apparatus for the precise treatment of powder and/or particles including a closure having a raw material supply which feeds powder/particles, a vessel which can be sealingly closed by the closure, a rotary shaft extending through the center of the bottom surface of the vessel, an agitation blade assembly including a plurality of blades extending from the top end of the rotary shaft in a radial array while maintaining a clearance with respect to the bottom surface of the vessel, and a chopper for adjusting the grain diameters of the powder/particle as the latter is mixed together by the agitation blade assembly, and characterized by the provision of a horizontal turntable fixedly mounted on the top end of the rotary shaft, a second rotary shaft driven from a drive source which is distinct from the drive source associated with the first mentioned rotary shaft and extending through the axis of the rotary shaft and through the turntable, and a second agitation blade assembly including a plurality of blades extending from the second rotary shaft in a radial array while maintaining a clearance with respect to the front surface of the turntable. With the present invention, the fourth object can be accomplished.

According to a second invention of the present application, the first and the third objects can be accomplished by providing the closure with means for feeding a binder into the vessel in the arrangement according to the first invention.

According to a third invention of the present application, there is provided an apparatus for the precise treatment of powder and/or particles including a closure having a raw material supply which feeds the powder/particle, a vessel which can be sealingly closed by the closure, a rotary shaft extending through the center of the bottom surface of the vessel, an agitation blade assembly including a plurality of blades extending from the top end of the rotary shaft in a radial array while maintaining a clearance with respect to the bottom surface of the vessel, and a chopper for adjusting the grain diameters of the powder/particles as the latter is mixed together by the agitation blade assembly, and characterized by the provision of a horizontal turntable fixedly mounted on the top end of the rotary shaft, a second rotary shaft driven from a drive source which is distinct from the drive source associated with the first mentioned rotary shaft and extending through the axis of the rotary shaft and through the turntable, a second agitation blade assembly including a plurality of blades extending from the second rotary shaft in a radial array while maintaining a clearance with respect to the front surface of the turntable, a mixture blade assembly fixedly mounted on the second rotary shaft at a location above the second agitation blade assembly in a radial array, and a tubular body disposed around and above the horizontal turntable so as to surround the second agitation blade assembly and the mixture blade assembly. With the present invention, the fourth object can be accomplished.

According to a fourth invention of the present application, the first object can be accomplished by providing the closure with means for feeding a binder into the vessel in the arrangement according to the third invention.

According to a fifth invention of the present application, the same object can be accomplished as by the third invention, by substituting a turntable for each of the agitation blade assemblies in the arrangement according to the third or the fourth invention.

According to a sixth invention of the present application, the second object can be accomplished by providing a door which opens or closes a discharge port for the grains formed at the peripheral wall of the vessel at an elevation midway thereof, and an open/close drive mechanism for automatically opening or closing the door in the arrangement according to one of the third to the fifth invention, thus allowing the powder/particles to be continuously fed from the raw material supply into the vessel where it is continuously processed to be displaced through the discharge port which is automatically opened by the open/close mechanism.

According to a seventh invention of the present application, there is provided an apparatus for the precise treatment of powder and/or particles including a closure having a raw material supply which feeds the powder/particles, a vessel which can be sealingly closed by the closure, a rotary shaft extending through the center of the bottom surface of the vessel, an agitation blade assembly including a plurality of blades extending from the top end of the rotary shaft in a radial array while maintaining a clearance with respect to the bottom surface of the vessel, and a chopper for adjusting the grain diameters of powder/the particles as the latter is mixed together by the agitation blade assembly, and characterized by the provision of a stationary table disposed above the agitation blade assembly and fixedly mounted on the top end of a shaft member which extends through the axis of the rotary shaft, a stationary tubular body disposed around the peripheral edge of the stationary table, a second agitation blade assembly including a plurality of blades extending in a radial array while maintaining a clearance with respect to the front surface of the stationary table, the second agitation blade assembly being movable into or out of the stationary tubular body, and an elevating mechanism connected to the second agitation blade assembly through a second rotary shaft which rotatably extends through the closure. With the present invention, the second and the fourth object can be accomplished.

According to an eighth invention of the present application, the first object can be accomplished by providing the closure with means for feeding a binder into the vessel in the arrangement of the seventh invention;

According to a ninth invention of the present application, the first or the fourth object can be accomplished by substituting a turntable for each of the agitation blade assemblies in the arrangement according to the seventh or the eighth invention.

According to a tenth invention of the present application, the third object can be accomplished, by providing a door which opens or closes a discharge port for the grains formed provided in the peripheral wall of the vessel at an elevation midway thereof, and an open/close drive mechanism which automatically opens or closes the door in the arrangement according to one of the second to the fifth invention, thereby allowing the powder/particle to be continuously supplied from the raw material supply into the vessel where it is continuously treated, and allowing the treated product to be displaced through the discharge port which is automatically opened by the open/close mechanism.

DETAILED DESCRIPTION OF THE PREFERRED EMBODIMENTS

Figure 1:
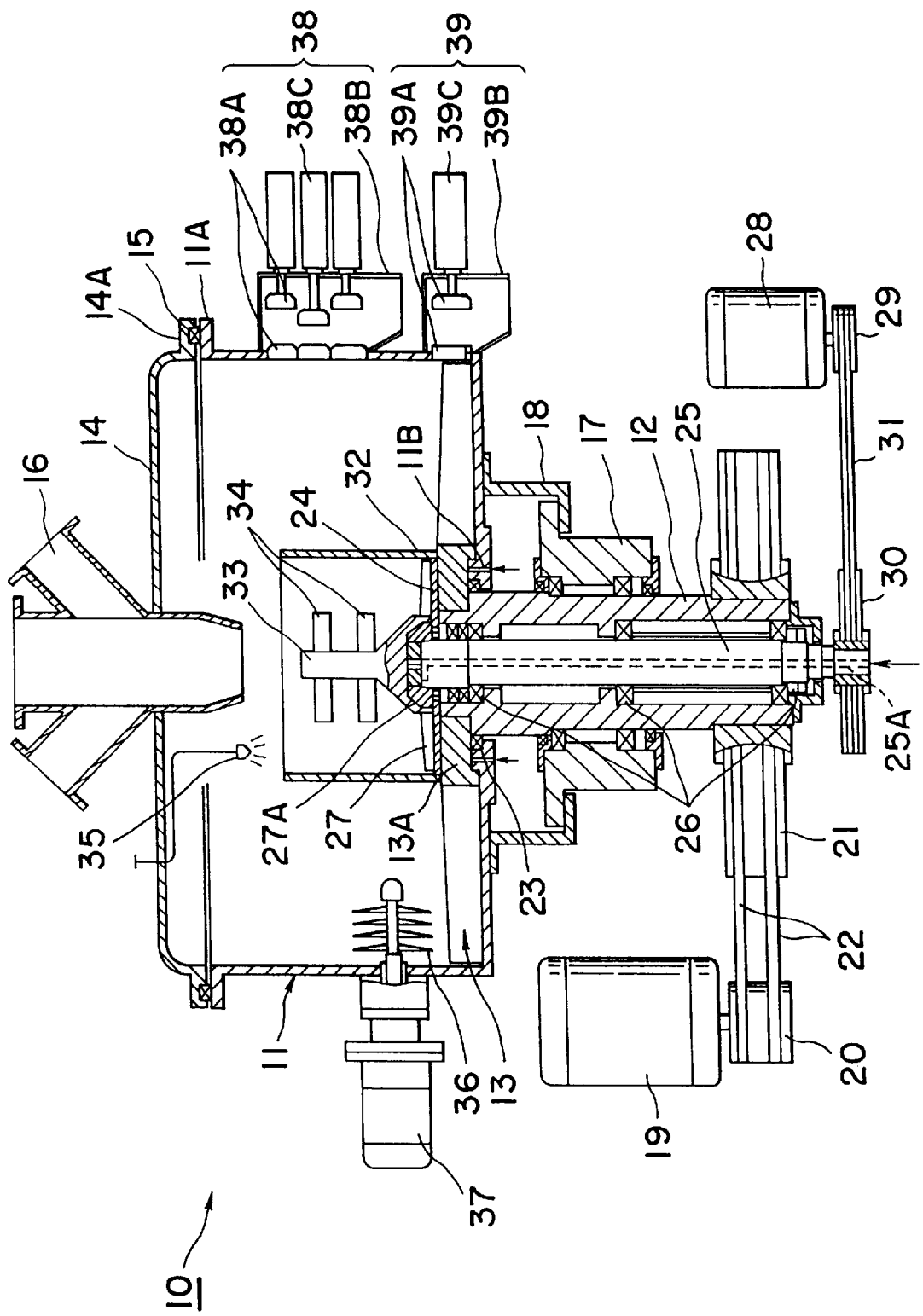
FIG. 1 is a cross section of an apparatus for the precise treatment of powder and/or particles according to an embodiment of the invention.

An apparatus for the precise treatment of powder and/or particles which is suitable to be used as a continuous granulator will be initially described. As shown in FIG. 1, an apparatus the for precise treatment of powder and/or particles 10 according to a first embodiment of the invention comprises a vessel 11 which is substantially in the form of a bottomed right cylinder and has an opening at its upper end, a rotary shaft 12 extending through the center of the bottom surface of the vessel 11, and an agitation blade assembly 13 including a plurality of blades which are mounted on the top end of the rotary shaft 12. The agitation blade assembly 13 is driven for rotation through the rotary shaft 12 for agitating a charge of powder and/or particles to prepare grains. A closure 14 is detachably mounted on the top end of the vessel 11 so as to cover the top opening thereof. The outer periphery of the vessel 11 and the closure 14 are each formed with a flange 11A, 14A, respectively, whereby the vessel 11 and the closure 14 can be sealingly closed together by an O-ring 15 mounted on the flange 14A. A raw material supply tube assembly 16 is mounted centrally on the closure 14 and may be branched into three tube sections, for example, so that up to three kinds of powder/particles can be simultaneously fed into the vessel 11 as required.

The rotary shaft 12 is rotatably supported by a bearing 17 at a location below the vessel 11. Specifically, a tubular support member 18, aligned with the center of the bottom surface of the vessel, depends downward from the vessel 11, and bearing 17 is fixedly mounted on the support member 18. A motor 19 is disposed below the vessel 11 for rotating the agitation blade assembly 13. A small pulley 20 is fixedly mounted on the drive shaft of the motor 19 while a larger pulley 21 is fixedly mounted on the lower end of the rotary shaft 12, and a belt 22 extends around both pulleys 20, 21. Accordingly, when the motor 19 is set in motion, the rotary shaft 12 is driven for rotation through the combination of the small pulley 20, the belt 22 and the radial pulley 21, thus driving the agitation blade assembly 13 for rotation. The assembly 13 includes a plurality of blades which extend in a radial array from its boss 13A, with the radially outer ends of the blades being located slightly spaced from the inner peripheral surface of the vessel 11 while leaving a granulation clearance between the respective blades and the bottom surface of the vessel 11. An oil seal 23 is interposed between the boss 13A and the bottom surface of the vessel 11, thus maintaining a hermetic seal within the vessel 11.

The upper surface of the boss 13A defines a circular flat surface, on which a turntable 24 is fixedly mounted. It will be seen that the turntable 24 rotates integrally with the agitation blade assembly 13. The rotary shaft 12 for the agitation blade assembly 13 is made hollow, and a second rotary shaft 25 is inserted into the rotary shaft 12 in alignment with the axis of the rotary shaft 12, thus constituting together a coaxial structure. Bearings 26 are interposed between the rotary shaft 12 and the second rotary shaft 25 at three vertically spaced locations, and thus the second rotary shaft 25 is rotatable inside the rotary shaft 12. The second rotary shaft 25 extends through the turntable 24 and projects into the vessel 11 where a second agitation blade assembly 27 is fixedly mounted on the top end of the second rotary shaft 25. The second agitation blade assembly 27 includes a boss 27A and a plurality of blades which extend from the boss to a point adjacent to, but slightly short of, the outer periphery of the turntable 24 while forming a granulation clearance with respect to the turntable 24.

The lower end of the second rotary shaft 25 projects below the lower end of the rotary shaft 12 and is connected to a motor 28 disposed below the vessel 11 through a small pulley 29 which is fixedly mounted on the drive shaft of the motor 28, a larger pulley 30 which is fixedly mounted on the lower end of the second rotary shaft 25 and a belt 31 extending around both pulleys 29, 30. Accordingly, when the motor 28 is set in motion, the second rotary shaft 25 is driven for rotation through the combination of the small pulley 29, the belt 31 and the larger pulley 30, thus driving the second agitation blade assembly 27 for rotation.

A tubular body 32 is fixedly mounted around the outer peripheral edge of the turntable 24 in a detachable manner, and partitions the space within the vessel 11 to define a pre-mixing chamber for the powder/particles. A third rotary shaft 33 is detachably connected to the top end of the second rotary shaft 25 and a pair of vertically spaced mixer blade assemblies, each including a radial array of blades, are fixedly mounted on the third rotary shaft 33. It is to be noted that the blades in the pair of mixture blade assemblies 34 are twisted in mutually opposite directions. The mixture blade assemblies 34 rotate integrally with the second agitation blade assembly 27, serving to guide the powder/particles which is continuously fed from the raw material supply tube 16 downward into the tubular body 32 in a positive manner while allowing the powder/particles to be evenly mixed within the pre-mixing chamber. Thus, the powder/particles which is continuously fed into the tubular body 32 is positively guided into the pre-mixing chamber defined by the tubular member 32 while being mixed together by the mixture blade assemblies 34 before it is more evenly mixed together or granulated by the second agitation blade assembly 27.

In this manner, the agitation blade assembly 13 and the second agitation blade assembly 27 are independently driven by their associated respective motors 19, 28 to rotate in the same direction. However, the second agitation blade assembly 27 rotates at a higher rotational speed than the agitation blade assembly 13 and mixes and granulates the powder/particles into grains within the pre-mixing chamber, separately from the mixing granulating action which takes place by means of the agitation blade assembly 13. By choosing the rotational speed of the second agitation blade assembly 27 such that the difference between the peripheral speed of the radially outer end of the blades in the second agitation blade assembly 27 and the peripheral speed of a corresponding portion of the turntable 24 which integrally rotates with the agitation blade assembly 13 is substantially equal to the peripheral speed of the radially outer end of the blades in the agitation blade assembly 13, for example, a pre-mixing and a pre-granulation of the powder/particles may take place by the second agitation blade assembly 27 and may then be followed by a further mixing or a mixing and a granulation of the grains formed by the assembly 27 by means of the agitation blade assembly 13.

When the third rotary shaft 33 and the tubular body 32 are removed from the arrangement shown in FIG. 1, the radially outer end of the blades in the second agitation blade assembly 27 may have a relative peripheral speed with respect to the turntable 24 which is equal to the peripheral speed of the radially outer end the of blades in the agitation blade assembly 13 during the granulation process, thus enabling a scale-up of the granulator which allows the granulating action of the agitation blade assembly 13 to be complemented by the second agitation blade assembly 27, and thus enabling a yield of grains having more uniformly converging grain diameters to be increased than can be achieved according to the prior art.

A spray nozzle 35 is attached to the closure 14 and is located above the tubular body 32 disposed within the vessel 11 so that a binder such as water, an organic solvent or the like may be applied to a fraction of the powder/particles which overflows the tubular body 32. A chopper 36 is mounted on the peripheral wall of the vessel 11 toward its bottom end and is horizontally disposed so as to be directed toward the center of the vessel 11. The chopper 36 is connected to a motor 37 which is fixedly mounted on the outer peripheral surface of the vessel 11 and is driven thereby for rotation at a higher speed so as to assist in making the grain diameters of the grains formed by the agitation blade assembly 13 more even. It will be noted that a product displacement mechanism 38 and a residue displacement mechanism 39 are mounted in vertical alignment with each other at a location which is circumferentially offset by 180° from the chopper 36. The product displacement mechanism 38 includes discharge ports formed in the peripheral wall of the vessel 11 at an elevation midway thereof at three vertical levels, doors 38A which open or close the discharge ports, a cover 38B enclosing the doors 38A and having a discharge port formed in its bottom end and cylinders 38C which operate to open or close the three doors 38A from outside the cover 38B. It will be noted that an upper discharge port delivers grains of an increased grain diameter as a result of an increased residence time within the vessel 11 to promote the granulation process. The residue displacement mechanism 39 is generally constructed in the similar manner as the product displacement mechanism 38, and includes a single discharge port, a door 39A, a cover 39B and a cylinder 39C.

A plurality of apertures 11B are formed in the bottom surface of the vessel 11 so as to surround the rotary shaft 12, and compressed air is fed into the vessel 11 through the apertures 11B, as indicated by an arrow shown in FIG. 1, thus preventing the ingress of the powder into the space between the bottom surface and the boss 13A. The second rotary shaft 25 is also formed with a through-opening 25A which is aligned with the axis thereof and through which compressed air is fed into the vessel 11, in a direction indicated by an arrow shown in FIG. 1, also preventing the ingress of the powder into the space between the turntable 24 and the boss 27A.

The operation of the apparatus 10 when it is used in a continuous granulation process will be described. Initially, a single or up to three kinds of powder/particles are continuously fed as a raw material from the raw material supply tube 16 into the tubular body 32 at a given flow rate. At this time, the motor 19 serves as a drive source which drives through the rotary shaft 12, the agitation blade assembly 13 and the turntable 24 for rotation, and the motor 28 serves as a drive source which drives through the second rotary shaft 25, the second agitation blade assembly 27 and the mixture blade assembly 34 for rotation at a rotational speed which is higher than the rotational speed of the agitation blade assembly 13 and the turntable 24. Accordingly, when a plurality of powders/particles are continuously fed into the tubular body 32, the mixture blade assembly 34 guides the charge into the pre-mixing chamber defined by the tubular body 32 while mixing it. The second agitation blade assembly 27 rotates over the turntable 24 within the pre-mixing chamber for evenly mixing the plurality of powders/particles and preparing the mixture charge. As the powders/particles continue to be fed and gradually accumulate in the pre-mixing chamber, the charge is evenly mixed under the influence of the mixture blade assembly 34. When the pre-mixing chamber is fully occupied, the charge is subjected to centrifugal forces, which cause it to overflows the tubular body 32 in a gradual manner. Because the spray nozzle 35 directs a binder continuously toward the powders/particles, the powders/particles which are preliminarily subjected to a mixing action within the chamber overflow toward the agitation blade assembly 13 while they contain a quantity of binder.

The powders/particles which overflow are then subjected to the agitating and the mixing action of the agitation blade assembly 13 and roll over the bottom surface of the vessel 11 under the influence of the binder, whereby they are gradually converted into grains. Under the influence of the binder, the mixed powders/particles coagulate on the grains, which therefore increase in grain diameters. At this time, the chopper 36 operates to adjust the grain diameters, and the grains are brought to more uniformly converging grain diameters. The grain diameter closely depends on the residence time of the grains within the vessel 11 and the peripheral speed of the agitation blade assembly 13. However, for a constant peripheral speed, the longer the residence time, the greater the diameter of the grains. Also, the higher the peripheral speed, the greater the specific gravity of the resulting grain, which will be more tightly packed. When it is desired to prepare grains of a relatively large grain diameter, the uppermost air cylinder 38C of the product displacement mechanism 38 is operated to open its associated door 38A, whereby grains of a greater diameter can be continuously delivered.

With the described embodiment, the turntable 24 and the tubular body 32 are disposed centrally on the bottom surface of the vessel 11 to define the pre-mixing chamber, and the second agitation blade assembly 27 and the mixture blade assembly 34 are disposed within the tubular body 32, with the rotational speed of the second agitation blade assembly 27 and the mixture blade assembly 34 being chosen to be higher than the rotational speed of the turntable 24, with the spray nozzle 35 being disposed above the tubular body 32. This allows a preliminary mixing of up to three powders/particles which are fed from the raw material supply tube 16 evenly by the action of the second agitation blade assembly 27 and the mixture blade assembly 34 within the tubular body 32. After the preliminary mixing, the mixed powders/particles may overflow from the tubular body 32 toward the agitation blade assembly 13, and at this time, the binder may be applied to the mixed powders/particles. Subsequently, the mixed powders/particles are granulated by the action of the agitation blade assembly 13 and the grain diameters are adjusted by the chopper 36. In this manner, grains can be prepared which have an even dispersion of primary particle levels and an even grain diameter. It is to be understood that the term primary particle level refers to an initial condition of the powder/particle without coagulation. Thus, the present embodiment allows grains comprising an even mixture of powder/particles at the primary particle level to be prepared as contrasted to a conventional granulator of the agitation type.

In addition, with the present embodiment, doors 38A, which open or close discharge ports for grains which are formed, are provided in the peripheral wall of the vessel 11 at an elevation midway thereof at three vertical levels, and are associated with air cylinders 38C which operate them automatically. Accordingly, when the powder/particle are continuously fed from the raw material supply tube 16 into the vessel 11 where grains having an even grain diameter are prepared, such grains can be continuously delivered through one of the discharge ports which has its door 38A opened by the associated air cylinder 38C. The provision of the discharge ports at three vertical levels allows the residence time of the grains within the vessel 11 to be adjusted over three levels, and the grains of respective grain diameters can be continuously prepared.

When the spray nozzle 35 is not used or is omitted, the apparatus 10 can be operated as a continuous precision granulator or a continuous precision mixer.

When the apparatus 10 is operated as a continuous precision granulator, the powder/particles which has been previously added with a binder is fed from the raw material supply tube 16 into the tubular body 32. The tubular body 32 then functions as a primary granulating chamber, and the space located outside the tubular body 32 functions as a secondary granulating chamber. Specifically, when up to three kinds of powders/particles, inclusive of the binder, are continuously fed from the supply tube 16 into the tubular body 32, they are temporarily stored within the tubular body 32 while the mixture blade assembly 34 mixes the powders/particles. Because the second agitation blade assembly 27 is rotating in the same direction as the turntable 24 within the tubular member 32 with a peripheral speed higher than that of the turntable 24, which may be chosen such that a difference between the peripheral speed of the radially outer end of blades in the second agitation blade assembly 27 and the peripheral speed of a corresponding part of the turntable 24 is substantially equal to the peripheral speed of the radially outer end of blades in the agitation blade assembly 13, the second agitation blade assembly 27 is effective to cause the powders/particles inclusive of the binder to roll on the turntable 24 while evenly mixing them. The mixed powders/particles are gradually converted into primary grains while they are rolling on the turntable. Subsequently, when the primary grains overflow from the tubular body 32 toward the agitation blade assembly 13 together with the powders/particles which are not yet granulated, the agitation blade assembly 13 cause the primary grains and remaining powders/particles to roll on the bottom surface of the vessel 11 and also cause them to be subject to the action of the chopper 36, whereby secondary grains having a uniform grain diameter are prepared. The resulting grains are continuously delivered through the product displacement mechanism 38 in a manner depending on the length of the residence time.

Accordingly, with the present embodiment, if the central part of the agitation blade assembly 13 has a reduced peripheral speed, which is insufficient to exercise a granulating action, the lack of the granulating action in this region can be complemented by the combination of the second agitation blade assembly 27 and the turntable 24, thus allowing grains of a more uniform grain diameter to be prepared continuously.

It will be noted that because the peripheral speed of the second agitation blade assembly 27 is higher than the peripheral speed of the turntable 24 and the tubular body 32 in order to allow the peripheral speed of the second agitation blade assembly 27 relative to the turntable 24 and the tubular body 32 to be substantially equal to the peripheral speed of the agitation blade assembly 13, the core portion of the secondary grains, which correspond to the primary grains, have a specific gravity which is higher than the specific gravity of the outer shell, which correspond to the secondarily granulated portions, thus providing a double structure having a differential specific gravity.

When the apparatus 10 is to be operated as a continuous precision mixer, up to three powders/particles, not containing a binder, are fed from the raw material supply tube 16 into the tubular body 32, which then functions as a premixing chamber. Thus, in this instance, a charge of powders/particles is temporarily stored within the tubular body 32 while the mixture blade assembly 34 mixes the powders/particles. Because the second agitation blade assembly 72 is rotating within the tubular body 32 at a peripheral speed which is higher than the peripheral speed of the turntable 24, the second agitation blade assembly 27 is effective to mix the powders/particles evenly on the turntable 24. Subsequently, when the mixed powders/particles overflow from within the tubular body 32 toward the agitation blade assemble 13, the chopper 36 finely crushes any coagulation of the powders/particles on the bottom surface of the vessel 11 and the agitation blade assembly 13 exercises further mixing of the powders/particles thus crushed, thereby continuously preparing mixed powders/particles which are more evenly mixed.

Accordingly, with the present embodiment, the second agitation blade assembly 27 and the mixture blade assembly 34 cooperate with each other within the tubular body 32 to provide a preliminary mixing of up to three kinds of powders/particles fed from the raw material supply tube 16, and subsequently, on the outside of the tubular body 32, the chopper 36 crushes individual powders/particles, which are then subjected to a further mixing by the agitation blade assembly 13. Consequently, powders/particles which are mixed far more evenly than in a conventional paddle mixer in which initial powders/particles are directly mixed together can be continuously prepared. By changing the residence time of the mixed powders/particles depending on the operated door 38A in the product displacement mechanism 38, a more even mixture of powders/particles can be prepared.

The tubular body 32 and the mixture blade assembly 34 may be removed from the apparatus 10, whereby a scale-up which has been difficult to achieve with a conventional granulator of the agitation type can be realized. In this instance, the spray nozzle 35 is operative while the product displacement mechanism 38 is omitted, using the apparatus as a batch granulator of the agitation type. Specifically, when three kinds of powders/particles are fed from the raw material supply tube 16 and a binder is fed from the spray nozzle 35, the agitation blade assembly 13 and the turntable 24 rotate at the same rotational speed within the vessel 11 while the second agitation blade assembly 27 rotates in the same direction, but at a higher speed than the assembly 13 and the turntable 24. An arrangement is made such that the peripheral speed of the radially outer end of the blades in the second agitation blade assembly 27 relative to the turntable 24 is substantially equal to the peripheral speed of the agitation blade assembly 13 relative to the bottom surface of the vessel. Accordingly, it will be seen that within the vessel 11, the agitation blade assembly 13 agitate and mix three kinds of powders/particles on the bottom surface of the vessel to convert them into grains, and in a region corresponding to the central part of the agitation blade assembly 13, the second agitation blade assembly 27 causes the powders/particles to roll on the turntable 24 to complement the granulating action which is devoid in the central part of the agitation blade assembly 13. The diameters of the grains formed can be adjusted by the chopper 36, allowing grains to be prepared having grain diameters which converge to a given grain diameter.

In this manner, with the present embodiment, the combination of the second agitation blade assembly 27 and the turntable 24 can complement an insufficient granulating action which may occur in the central part of the agitation blade assembly 13, enabling a scale-up of the batch granulator, which has been impossible in the prior art, in a facilitated manner while allowing grains of converging grain diameters to be prepared.

In the described embodiment, the agitation blade assemblies 13, 27 are used to convert powders/particles into grains, but these agitation blade assemblies may be replaced by discs. The use of discs for agitating and mixing purposes allows substantially spheroidal grains to be prepared.

Figure 2:
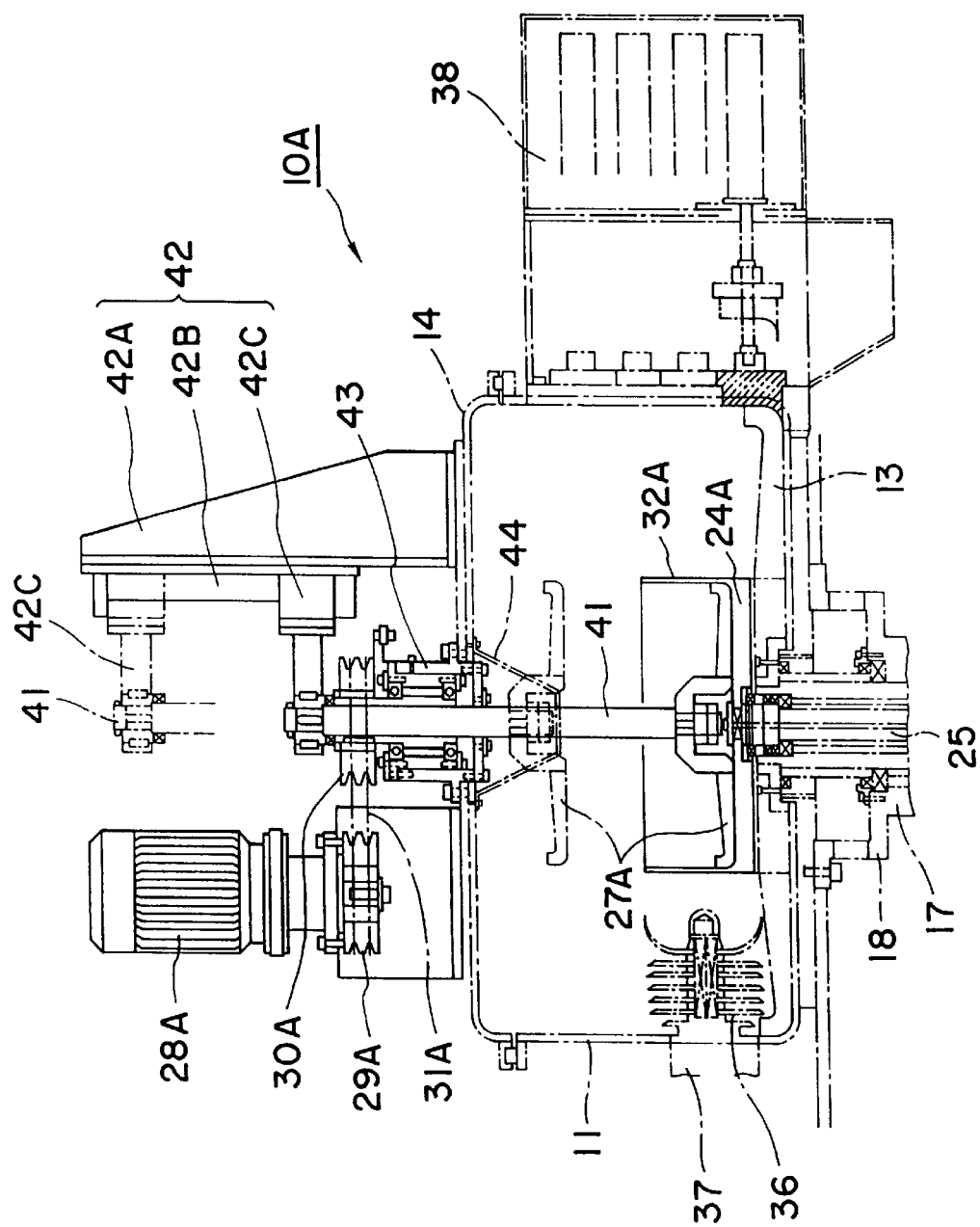
FIG. 2 is a cross section illustrating another embodiment of the invention.
Figure 3:
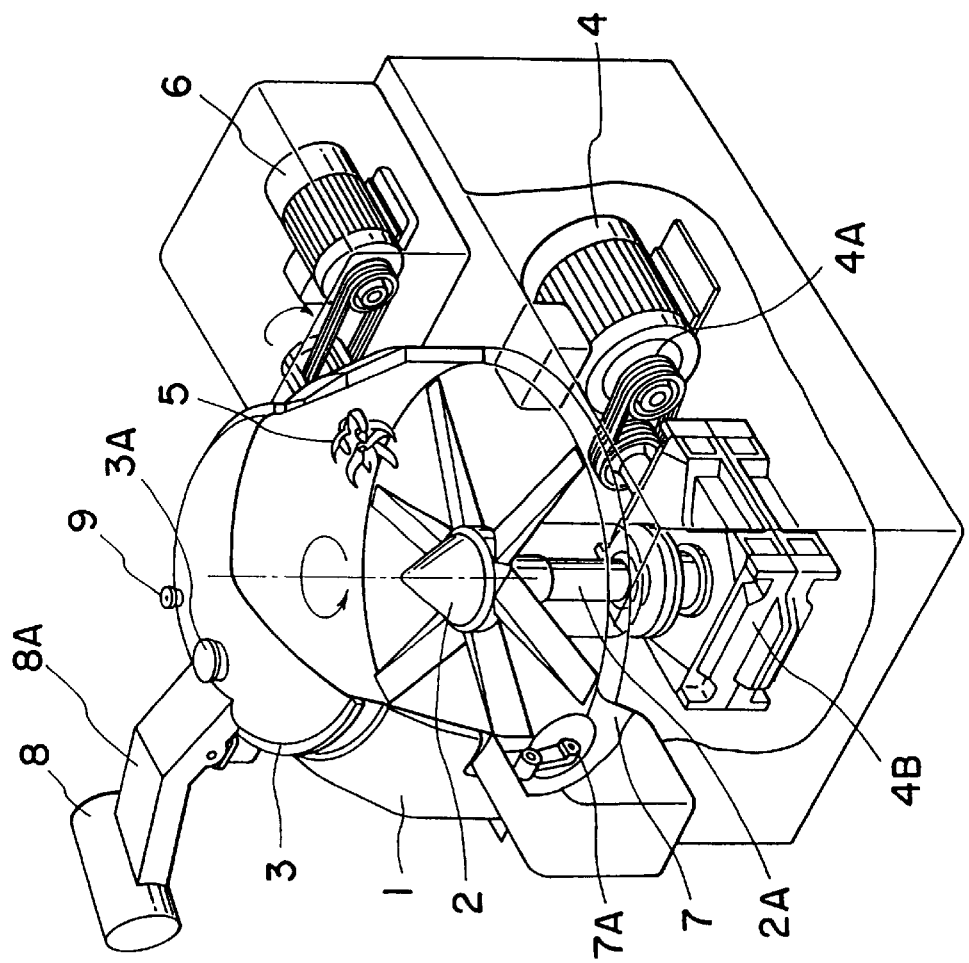
FIG. 3 is a perspective view, partly exploded, of a conventional granulator.

FIG. 2 is a cross section of an essential part of an apparatus for the precise treatment of powder and/or particles according to another embodiment of the invention. The apparatus 10A of the second embodiment is constructed essentially in a similar manner as the apparatus 10 shown in FIG. 1 except for the construction of a second agitation blade assembly, a tubular body and a turntable. Accordingly, similar parts to those shown in FIG. 1 are designated by like reference characters as used in FIG. 1, and the following description principally deals with the differences or features of the second embodiment.

An agitation blade assembly 13 is mounted within a vessel 11 and is driven for rotation through a rotary shaft 12. The rotary shaft 12 is made hollow, and a shaft member 25 extends therein along the axis, with its upper end projecting into the vessel 11. A stationary table 24A is fixedly mounted on the upper end of the shaft member 25 to face a boss 13A of the agitation blade assembly 13 with a small clearance therebetween. A stationary tubular body 32A is fixedly mounted around the periphery of the stationary table 24A. The second rotary shaft 25 shown in FIG. 1 is directly used as the shaft member 25, which however is not associated with the motor 28, but is operated as a non-rotating shaft member 25. Accordingly, the stationary table 24A and the stationary tubular body 32A form together a stationary cylinder with a bottom, which is fixedly mounted on the upper end of the shaft member 25 and is thus separated from the agitation blade assembly 13 and remains stationary. A second agitation blade assembly 27A is disposed inside the bottomed stationary cylinder.

A closure 14 has a central bore, through which a second rotary shaft 41 extends. The second agitation blade assembly 27A is fixedly mounted on the lower end of the second rotary shaft 41 while the upper end of the second rotary shaft 41 is connected to an elevating mechanism 42 which is disposed on the upper surface of the closure 14 offset from the central bore in the closure 14. The elevating mechanism 42 comprises a bracket 42A disposed on the closure 14, a vertically extending guide rod 42B which is supported by the bracket 42A and a connecting member 42C which is elevated up and down along the guide rod 42B. The second rotary shaft 41 is rotatably connected to the connecting member 42C through a horizontal arm. Accordingly, by pulling up the connecting member 42C along the guide rod 42B, the second rotary shaft 41, and hence the second agitation blade assembly 27A can be pulled upward from within the stationary tubular body 32A.

The second rotary shaft 41 is connected to a motor 28A which is disposed on the closure 14 as offset from the central bore therein through pulleys 29A, 30A and a belt 31A extending therearound. When the motor 28A is set in motion, the second rotary shaft 41 is driven for rotation at a given number of revolutions. A raw material supply tube identical to the raw material supply tube 16 shown in FIG. 1, (but omitted from illustration in FIG. 2) is disposed on the closure 14 to feed powder/particles as a raw material into the stationary tubular member 32A. In other respects, the arrangement is similar to the arrangement used in the apparatus 10 shown in FIG. 1. In FIG. 2, the second rotary shaft 41 is supported by a bearing 43. In FIG. 2, the elevating mechanism 42 is arranged to be manually operated, but an air cylinder, for example, may be used to elevate the connecting member 42C up and down along the guide rod 42B.

The apparatus 10A may be operated in the same manner as the apparatus 10 shown in FIG. 1, as required. In this instance, the elevating mechanism 42 is used to pull up the second rotary shaft 41, and the stationary table 24A, the stationary tubular body 32A and the second agitation blade assembly 27A may be replaced by the turntable 24, the tubular body 32 and the second agitation blade assembly 27 mentioned above. After the replacement of these members, a cover 44 may be mounted on the inside of the closure 14, thus shielding the lower end of the second rotary shaft 41.

The operation will now be described. A single or up to three kinds of powders/particles inclusive of a binder are continuously fed as raw material from a raw material supply tube, not shown, into the stationary tubular body 32A at a given flow rate. At this time, the agitation blade assembly 13 is driven through the rotary shaft 12 for rotation, and the motor 28A, acting as a drive source, drives the second agitation blade assembly 27A through the second rotary shaft 41 for rotation at the same peripheral speed as that of the agitation blade assembly 13 over the stationary table 24A and within the stationary tubular body 32A. The interior of the stationary tubular body 32A defines a primary granulating chamber, and the outside of the stationary tubular member 32A defines a secondary granulating chamber. Accordingly, when a mixture of powders/particles are fed into the stationary tubular member 32A, the charge is subjected to the agitating and mixing action by the second agitation blade assembly 27A under the influence of the binder, thus rolling on the stationary table 24A to be gradually converted into primary grains. When the primary grains overflow from the stationary tubular member 32A, they continue to be subjected to the granulating action by the agitation blade assembly 13 which is located outside thereof, and are also subjected to the action of the chopper 36, whereby they grow into secondary grains having converging diameters which will be continuously delivered to the outside through a product displacement mechanism 38.

Because the agitation blade assembly 13 and the second agitation blade assembly 27A have an equal peripheral speed, the granulating action presented by these assemblies will be substantially similar, whereby the core of the secondarily granulated grains, which correspond to the primary grains, have a specific gravity which is substantially equal to the specific gravity of the outer shell, which corresponds to the secondarily granulated grains, thereby obtaining secondary grains having an even specific gravity over the entire grains.

Thus, with the present embodiment, the stationary table 24A and the stationary tubular body 32A do not rotate during the granulating action while the second agitation blade assembly 27A rotates within the stationary tubular body 32A. Accordingly, it is a simple matter to establish a peripheral speed of the second agitation blade assembly 27A which is equal to the peripheral speed of the agitation blade assembly 13. Since both assemblies 27A, 13 rotate at an equal speed, grains can be obtained which have an even specific gravity. In addition, the function and the effect achieved by the apparatus 10 shown in FIG. 1 can also be obtained. If required, the apparatus 10A may be operated as an mixer.

It should be understood that the invention is not limited to any detail of the described embodiments, but that the components of the apparatus 10, 10A can be suitably changed or modified depending on the nature of the powder/particle and the requirements to treat it.

What is claimed is:

1. In an apparatus for the precise treatment of powder/particles comprising a closure having a raw material supply which feeds the powder/particles, a vessel which can be sealingly closed by the closure, a first rotary shaft extending through the center of the bottom surface of the vessel, an agitation blade assembly including a plurality of blades extending from the top end of the first rotary shaft in a radial array while maintaining a clearance with respect to the bottom surface of the vessel, and a chopper for adjusting the grain diameters of the powder/particles as the latter is mixed together by the agitation blade assembly; the improvement comprising said apparatus additionally comprising a horizontal turntable fixedly mounted on the upper end of the first rotary shaft;

a second rotary shaft driven from a drive source which is distinct from a drive source for the first rotary shaft and extending through the axis of the first rotary shaft and through the turntable;

and a second agitation blade assembly including a plurality of blades extending from the second rotary shaft in a radial array while maintaining a clearance with respect to the front surface of the turntable.

2. An apparatus according to claim 1 characterized in that the closure is provided with means for feeding a binder into the vessel.

3. In an apparatus for the precise treatment of powder/particles including a closure having a raw material supply which feeds the powder/particles, a vessel which can be sealingly closed by the closure, a first rotary shaft extending through the center of the bottom surface of the vessel, an agitation blade assembly including a plurality of blades extending from the top end of the first rotary shaft in a radial array while maintaining a clearance with respect to the bottom surface of the vessel, and a chopper for adjusting the grain diameters of the powder/particles as the latter is mixed together by the agitation blade assembly; the improvement comprising said apparatus additionally comprising a horizontal turntable fixedly mounted on the upper end of the first rotary shaft;

a second rotary shaft driven from a drive source which is distinct from a drive source for the first rotary shaft and extending through the axis of the first rotary shaft and through the turntable;

a second agitation blade assembly including a plurality of blades extending from the second rotary shaft in a radial array while maintaining a clearance with respect to the front surface of the turntable;

a mixture blade assembly fixedly mounted on the second rotary shaft and extending in a radial array above the second agitation blade assembly;

and a tubular body disposed around the peripheral edge of the horizontal turntable so as to surround the second agitation blade assembly and the mixture blade assembly.

4. An apparatus according to claim 3 characterized in that the closure is provided with means for feeding a binder into the vessel.

5. An apparatus according to one of claim 3 characterized in that a turntable is substituted for each of the agitation blade assemblies.

6. An apparatus according to claim 3, additionally comprising a door for opening and closing a discharge port for grains which is formed in the peripheral wall of the vessel at an elevation midway thereof;

an open/close drive mechanism for automatically opening or closing the door;

means for continuously feeding the powder/particles from the raw material supply into the vessel where the powder/particles are continuously treated, and means for delivering the treated product through the discharge port which is automatically opened by the open/close mechanism.

7. In an apparatus for the precise treatment of powder/particles comprising a closure having a raw material supply which feeds the powder/particles, a vessel which can be sealingly closed by the closure, a first rotary shaft extending through the center of the bottom surface of the vessel, an agitation blade assembly including a plurality of blades extending from the top end of the first rotary shaft in a radial array while maintaining a clearance with respect to the bottom surface of the vessel, and a chopper for adjusting grain diameters of powder/particle as the latter is mixed together by the agitation blade assembly; the improvement comprising said apparatus additionally comprising a stationary table disposed above the agitation blade assembly and fixedly mounted on the upper end of a shaft member which extends through the axis of the first rotary shaft;

a stationary tubular body disposed around the peripheral edge of the stationary table;

a second agitation blade assembly disposed within the stationary tubular body and including a plurality of blades extending in a radial array and maintaining a clearance with respect to the front surface of the stationary table;

and an elevating mechanism connected to the second agitation blade assembly through a second rotary shaft which rotatably extends through the closure.

8. An apparatus according to claim 7 characterized in that the closure is provided with means for feeding a binder into the vessel.

9. An apparatus according to one of claim 7 characterized in that a turntable is substituted for each of the agitation blade assemblies.

10. An apparatus according to claim 7 additionally comprising a door for opening or closing a discharge port for grains which is formed in the peripheral wall of the vessel at an elevation midway thereof;

an open/close drive mechanism for automatically opening or closing the door;

means for continuously feeding the powder/particle from the raw material supply into the vessel where it is continuously treated, and means for delivering the treated product through the discharge port which is automatically opened by the open/close mechanism.

* * * * *

UNITED STATES PATENT AND TRADEMARK OFFICE
CERTIFICATE OF CORRECTION

PATENT NO : 6 042 033
DATED : March 28, 2000
INVENTORS : Yutaka SUGIMOTO et al It is certified that error appears in the above-identified patent and that said Letters Patent are hereby corrected as shown below:

```
Column 14, line 30; delete "one of".

Column 15, line 9;  delete "one of".
```

Signed and Sealed this

Twenty-fourth Day of April, 2001

Attest:

NICHOLAS P. GODICI

*Attesting Officer*  *Acting Director of the United States Patent and Trademark Office*